United States Patent
Richardson et al.

(10) Patent No.: US 8,262,838 B2
(45) Date of Patent: Sep. 11, 2012

(54) FUSIBLE COMPLETION PLUG

(75) Inventors: Allen C. Richardson, Broken Arrow, OK (US); Blake Mathews, Tulsa, OK (US)

(73) Assignee: TDW Delaware Inc., Wilmington, DE (US)

( * ) Notice: Subject to any disclaimer, the term of this patent is extended or adjusted under 35 U.S.C. 154(b) by 779 days.

(21) Appl. No.: 12/340,979

(22) Filed: Dec. 22, 2008

(65) Prior Publication Data
US 2010/0154988 A1   Jun. 24, 2010

(51) Int. Cl.
*B29C 65/30*   (2006.01)

(52) U.S. Cl. .................... 156/273.9; 156/293

(58) Field of Classification Search ............... 156/272.2, 156/273.9, 274.2, 293
See application file for complete search history.

(56) References Cited

U.S. PATENT DOCUMENTS

| | | | |
|---|---|---|---|
| 195,367 A | 9/1877 | Hiller | |
| 307,012 A | 12/1962 | Poulallion et al. | |
| 315,511 A | 11/1964 | Ver Nooy | |
| 352,536 A | 8/1970 | De Frees | |
| 376,694 A | 10/1973 | Osburn | |
| 392,779 A | 12/1975 | Hershberger | |
| 3,991,791 A * | 11/1976 | Luckenbill | 138/94 |
| 405,814 A | 11/1977 | Rankin | |
| 438,774 A | 6/1983 | Vanzant | |
| 469,327 A | 9/1987 | Wilson et al. | |
| 473,387 A | 3/1988 | Sugimura | |
| 488,308 A | 11/1989 | Weller et al. | |
| 494,701 A | 8/1990 | Minarovic | |
| 505,243 A | 10/1991 | Jiles | |
| 505,862 A | 10/1991 | Jiles | |
| 513,813 A | 8/1992 | Moreau et al. | |
| 5,269,340 A | 12/1993 | Drzewiecki | |
| 563,939 A | 6/1997 | Conley | |
| 597,514 A | 11/1999 | Wilson | |
| 611,628 A | 9/2000 | Wilson | |
| 628,655 A1 | 9/2001 | Morgan | |
| 6,286,553 B1 * | 9/2001 | Morgan | 138/89 |
| 6,681,795 B2 | 1/2004 | Beals et al. | |
| 735,383 A1 | 4/2008 | Calkins et al. | |
| 2002/0108945 A1 | 8/2002 | Kenworthy | |
| 2004/0089342 A1 | 5/2004 | Vennemann et al. | |
| 2006/0016552 A1 * | 1/2006 | Barbone et al. | 156/272.2 |

FOREIGN PATENT DOCUMENTS

JP   8334195   12/1996
JP   08334195 A  * 12/1996

OTHER PUBLICATIONS

Machine Translation of JP 08334195 A, Dec. 17, 1996.*
International Search Report and Written Opinion issued by the International Searching Authority (ISA/US) in corresponding PCT/US09/66385 on Jan. 26, 2010; 9 pages.

* cited by examiner

*Primary Examiner* — Daniel McNally
(74) *Attorney, Agent, or Firm* — Gable Gotwals

(57) ABSTRACT

A fusible completion plug and method for its use includes a cylindrical plug body having a lower portion that includes a fusible element in communication with an electric power supply. The completion plug also includes an elastomeric seal that provides for a temporary seal. A pressure balancing port and equalization valve are provided to relieve the differential pressure across the completion plug as the plug is positioned in place. The pressure equalization valve also includes a fusible element for fusing the valve within the port, thereby preventing a leak path through the plug body. A blind flange may be installed above the completion plug in case the plug fusion fails. The blind flange may be a traditional blind flange or may be a fusible blind flange.

4 Claims, 5 Drawing Sheets

FUSIBLE COMPLETION PLUG

REFERENCE TO PENDING APPLICATIONS

This application is not based upon any pending domestic or international patent applications.

FIELD OF THE INVENTION

This invention relates generally to the field of piping and pipeline repair systems. More specifically, this invention relates to a permanent completion plug for closing an opening in a tubular member or vessel.

BACKGROUND OF THE INVENTION

In piping and pipeline repair, it is frequently necessary to close an opening in a tubular member or vessel either temporarily, semi-permanently or, in the case of the present invention, permanently by way of a completion plug. The opening in the tubular member is usually permanently closed when a valve is not required (or no longer required) and is not desirable. One example of the use of a completion plug arises when a hot tap is made into a pipeline or vessel through a fitting connected to the pipeline or vessel.

In the typical hot tapping application, a fitting—usually in the form of a flange—is welded on the exterior of a pipe that has flowing gas or liquid under pressure. A valve is then secured to the flange and a hot tapping machine is secured to the valve. By use of specialized equipment, a hole can then be drilled through the wall of the pipe while gas or liquid continues to flow through it. This provides access to the interior of the pipe, such as for inserting equipment to temporary block flow through the pipe while repairs are being made. After repairs are complete, a threaded or non-threaded completion plug is typically inserted as a temporary seal so that the equipment may be reclaimed.

Threaded completion plugs are usually manually inserted into the flange and then a wrench or driver is inserted into a recess in the upper end of the plug so that the plug can be threadably rotated into a sealed position. Non-threaded closures typically include a mechanism by which a portion of the closure can be radially outwardly extended into an internal circumferential groove in the flange. Because neither type of closure provides an adequate permanent seal, after the equipment is reclaimed a blind flange must be installed as the final, permanent seal. A completion plug made according to this invention and a method for its use provides both the temporary seal and the final permanent seal.

BRIEF SUMMARY OF THE INVENTION

A completion plug for permanently closing an opening in a tubular member or vessel includes a cylindrical plug body having a lower portion that includes a circumferential fusible element in communication with an electric power supply. The completion plug also includes an elastomeric seal that provides for a temporary seal of the opening prior to the fusible element being fused and forming a permanent seal between an internal surface of the tubular member and an external surface of the completion plug. Because the elastomeric seal engages the internal surface of the tubular member during the positioning of the completion plug, a pressure balancing port and equalization valve are provided to relive the differential pressure across the completion plug as the plug is positioned within the member. The pressure equalization valve also includes a fusible element for fusing the valve within the port, thereby preventing a leak path through the plug body. A blind flange may be installed above the completion plug in case the fusion or permanent seal of the plug fails. The blind flange may be a traditional blind flange or may be a fusible blind flange.

The method for using the completion plug includes the steps of lowering the completion plug into an interior portion of the tubular member-which is typically a fitting having a flange, positioning the completion plug to a sealing position within the member, and relieving the differential pressure across the completion plug during the positioning step. Electric current may then be applied to the completion plug in order to fuse an external cylindrical surface portion of the completion plug to an internal cylindrical surface of the tubular member. Similarly, the pressure relief means-preferably a pressure equalization valve—may be fused within the pressure balancing port. Prior to fusion, the plug may provide a temporary seal within the tubular member. A blind flange may be installed above the completion plug to provide a redundant seal or a seal in case of fusion failure. The blind flange may be a fusible blind flange.

A better understanding of the invention will be obtained from the following detailed description of the preferred embodiments taken in conjunction with the drawings and the attached claims.

DETAILED DESCRIPTION OF THE PREFERRED EMBODIMENTS

Figure 1:
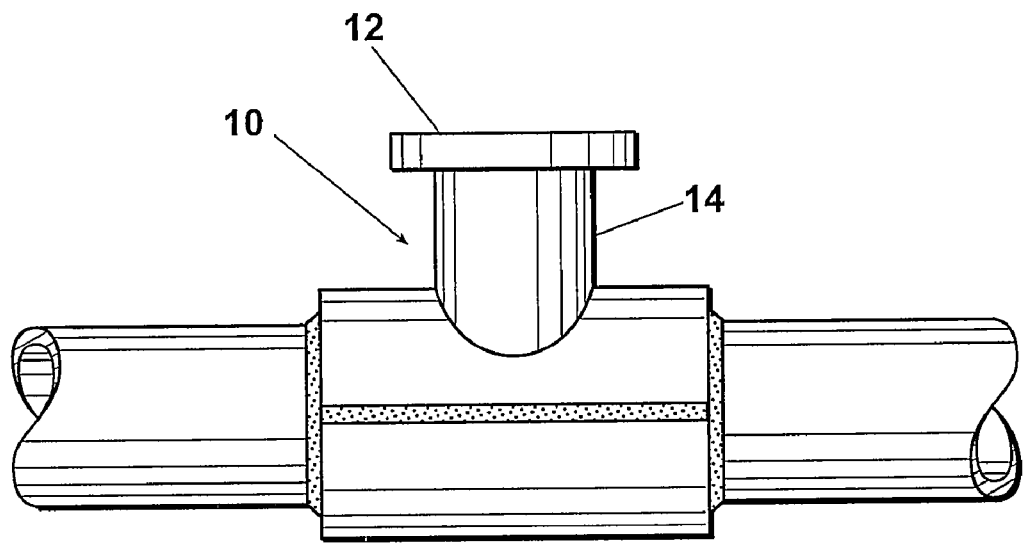
FIG. 1 is a view of a length of pipe or pipeline having a fitting for securing a branch line or accommodating a sandwich valve used in a hot tapping application. The pipe and fitting are preferably a polyethylene pipe and fitting.
Figure 2:
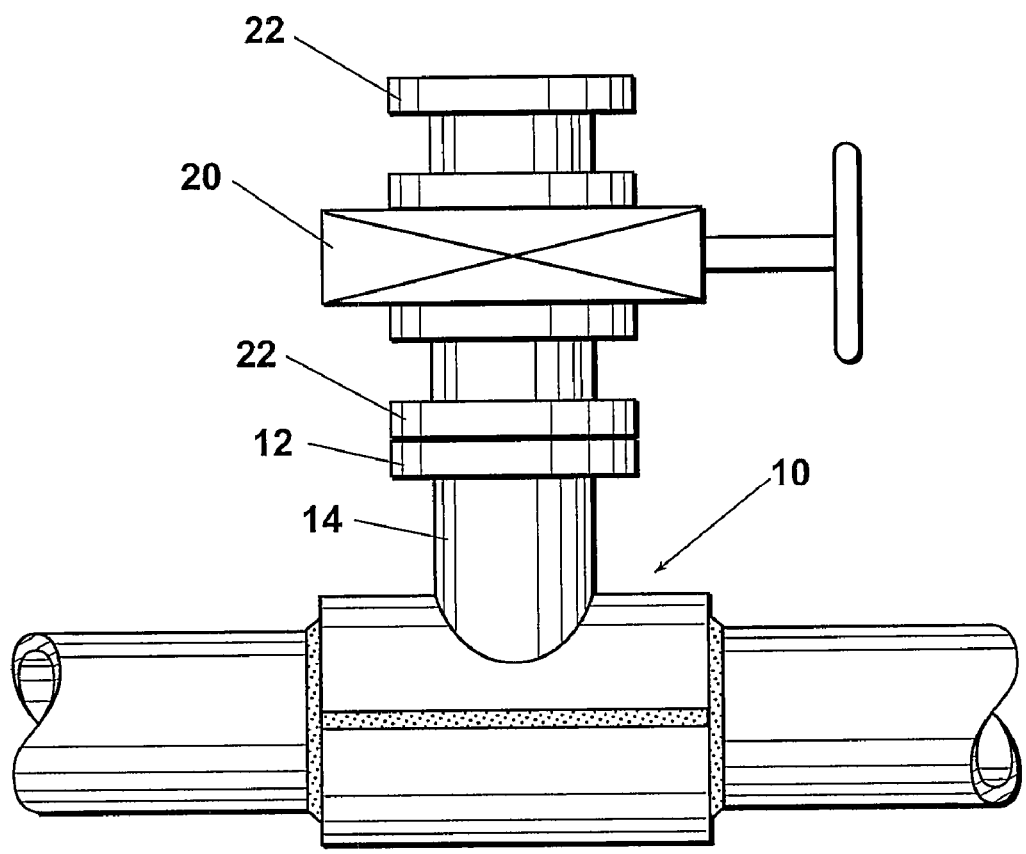
FIG. 2 is a view of the pipe having a valve secured to the fitting. A housing containing a hot tapping machine (not shown) is secured to the valve and used to cut an access hole in the pipe while the interior of the pipe is under fluid pressure.
Figure 3:
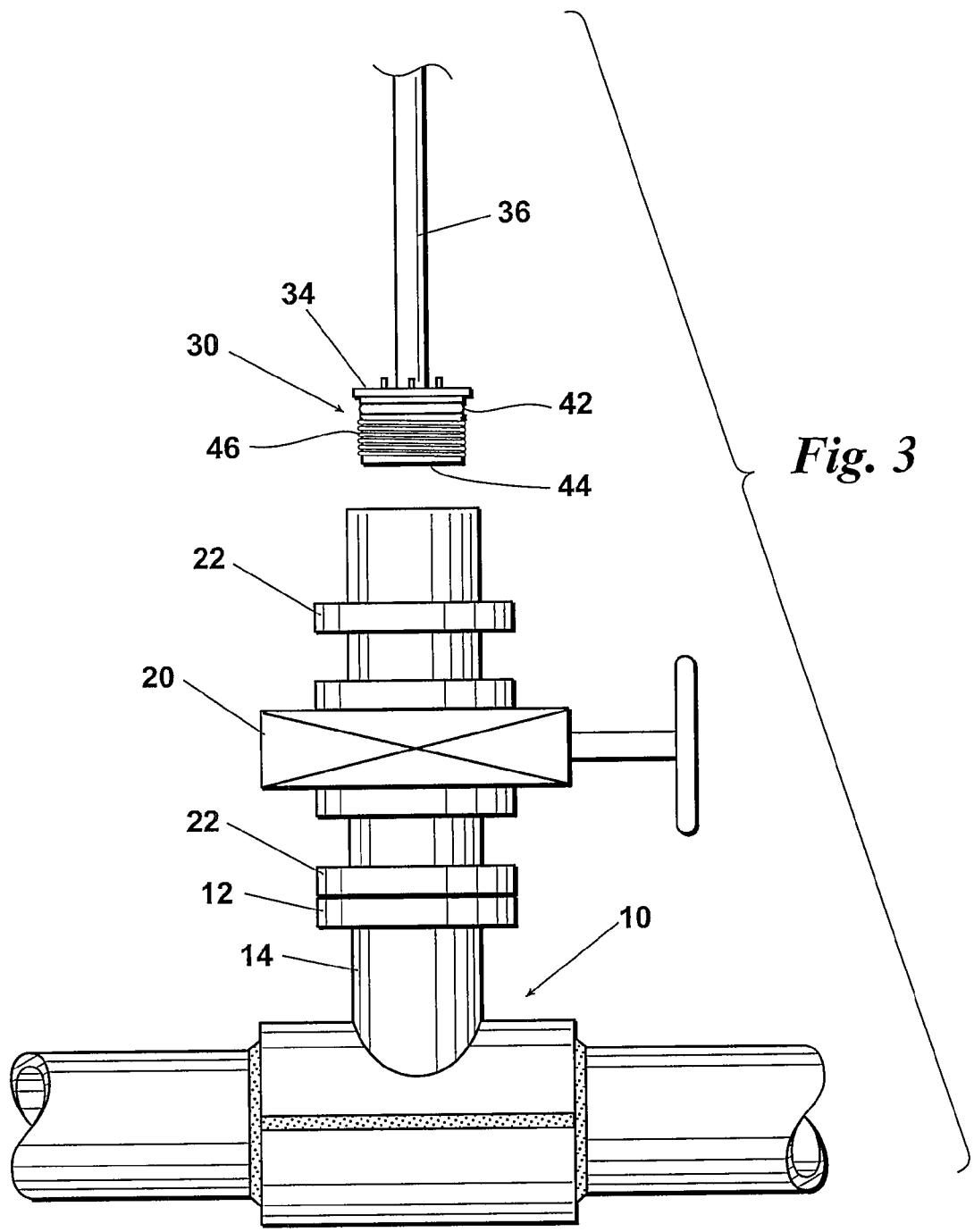
FIG. 3 is a view of the pipe after the repair has been complete. A completion plug that has a body sealing fusion wire is lowered through the valve and positioned within the neck of the fitting so that equipment may be reclaimed. The completion plug body is preferably a polyethylene material. After the equipment is reclaimed the completion plug body is fused to the internal cylindrical wall of the fitting.

Preferred embodiments of a fusible completion plug will now be described in reference to the drawings in which the elements are numbered as follows:

10 Fitting/tubular member
12 Flange
14 Neck
16 Internal cylindrical surface
18 Cylindrical groove
20 Valve
32 Adapter
30 Completion plug
32 Plug body
34 Upper end
36 Completion machine/adapter
38 Leaves or locking rings
40 Cylindrical groove
42 Elastomeric seal
44 Lower end
46 Fusible element/coil
48 External cylindrical surface
50 Fusion wire
52 Fusion terminal
54 Fusion zone
56 Space
60 Blind flange
62 Upper surface
64 Lower surface
66 Fusible element
68 Fastener
70 Fusion terminal
72 Fusion zone
74 Fusion wire
76 Gasket
80 Pressure balancing port
82 Port surface
84 Pressure equalization valve
86 Valve surface
88 Fusible element
90 Fusion zone Referring first to FIGS. 1 to 3, in a typical hot tapping operation a tubular member or fitting 10 is first installed on a section of piping or pipeline and a valve 20 is then connected by way of a first adapter 22 to the flange 12 of fitting 10. Fitting 10 is preferably a polyethylene fitting. A tapping machine (not shown) is then attached to the second adapter 22 and an access hole to the interior of the pipe is created while gas or liquid continues to flow through the pipe. A pipeline plugger (not shown) is then inserted into the interior of the pipe to block flow so that repairs may be made. After the repairs are complete and the pipeline plugger is removed, a completion plug 30 must be inserted into fitting 10 using an adapter 36 so that the valve 20, tapping machine and any other equipment may be reclaimed.

Figure 4:
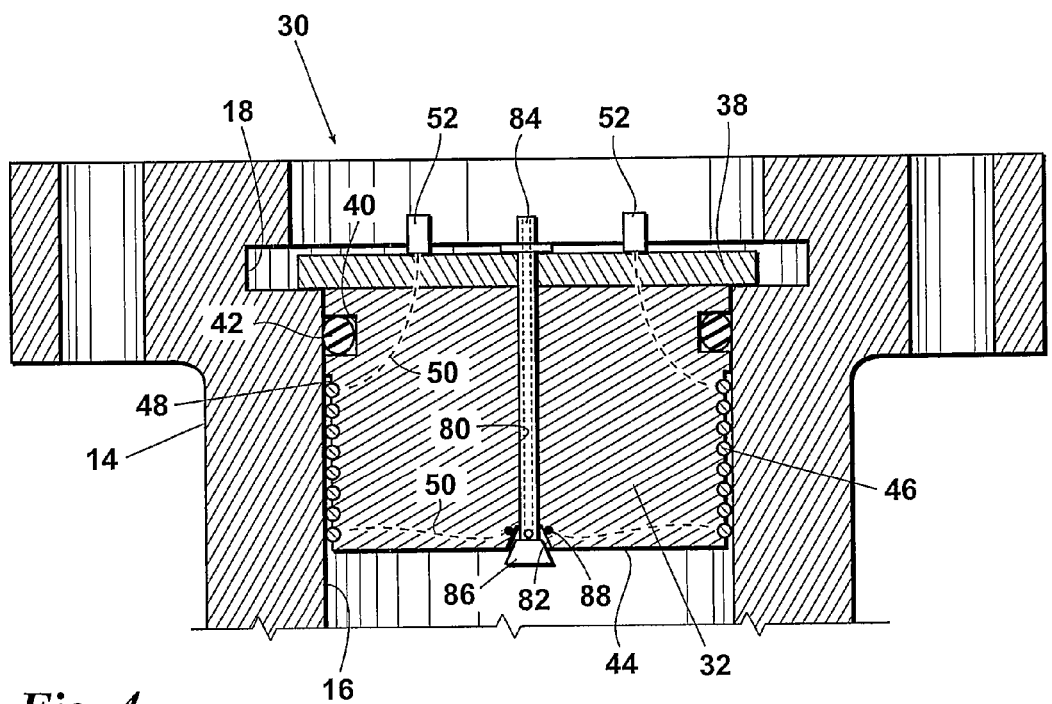
FIG. 4 is a view of the completion plug located within the neck of the fitting and in a temporary sealing state. A pressure balancing port, which is shown in its open position, is provided to help overcome any differential pressure across the completion plug as the elastomeric seal of the plug engages the internal cylindrical surface of the fitting. The downward travel of the completion plug is arrested when its leaves engage a circumferential ledge or groove within the neck. The leaves are shown in their retracted position.
Figure 5:
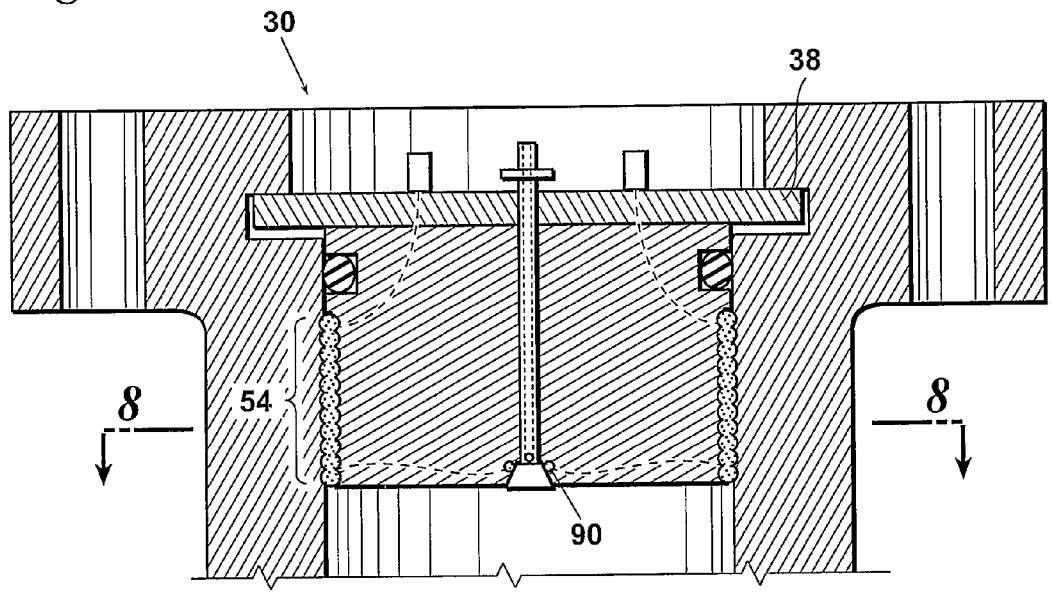
FIG. 5 is a view of the completion plug in a permanently sealed state. The leaves are expanded to engage the circumferential groove of the fitting and lock the completion plug into its proper sealing position. The body sealing fusion wire receives an electric current effective for fusing the plug body to an interior surface of the fitting. The pressure equalization valve located within the pressure balancing port is also fused to prevent a leak path.

Referring now to FIGS. 4 and 5, completion plug 30 preferably includes a short-length, cylindrical, polyethylene plug body 32 having a set of expandable locking rings or leaves 38 on its upper end 34. Upper end 34 is in communication with an adapter 36 (see FIG. 3). Adapter 36 allows an operator to manually insert completion plug 30 into fitting 10, position the plug 30 to its proper location within the neck 14 of fitting 10, and activate the leaves 38 which hold plug 30 in proper position within fitting 10. A cylindrical groove 40 in plug body 32 receives an elastomeric seal 42, such as an O-ring, that provides a temporary seal when completion plug 30 is properly positioned within neck 14.

Figure 8:
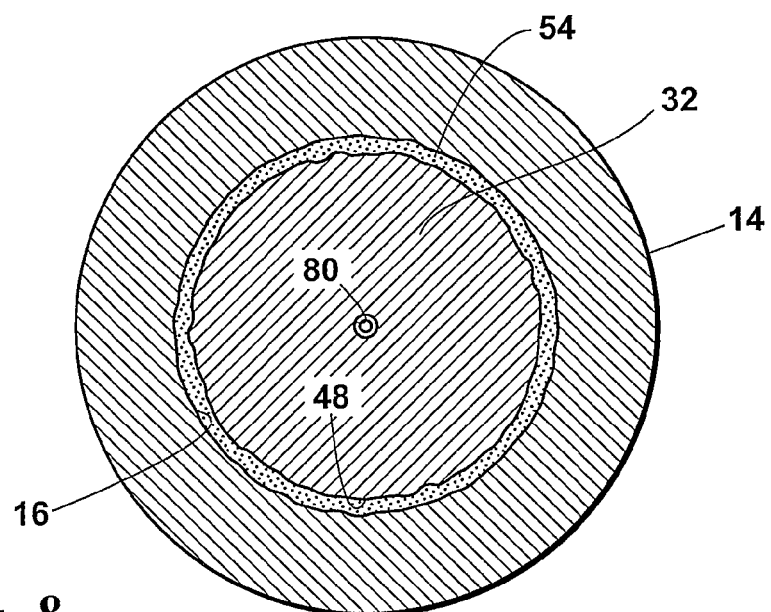
FIG. 8 is a view of the completion plug taken along section line 8-8 of FIG. 5. A permanent seal or fusion zone is formed between the external cylindrical surface of the plug body and the opposing internal cylindrical wall of the fitting.

Located toward the lower end 44 of completion plug 30 is a circumferential fusible element 46. In a preferred embodiment, fusible element 46 is a wire coil in communication with a set of fusion terminals 52. A person of ordinary skill in the art would recognize that fusible element 46 is an electric resistive element and is not necessarily limited to a wire coil. Fusion wires 50 connect fusion terminals 52 with fusible element 46. Fusion terminals 52 are, in turn, connected to a power supply (not shown). The power supply provides an electric current effective for fusing fusible element 46 so that a permanent seal 54 is formed between the fused external cylindrical surface 48 of plug body 32 and the opposing fused internal cylindrical surface 16 of neck 14. (See FIG. 8.)

To properly position completion plug 30 within neck 14, fitting 10 includes a circumferential ledge or groove 18. During the downward travel of completion plug 30 into fitting 10, the outer edge portions of leaves 38 contact groove 18, thereby arresting the downward travel of plug 30 and causing the plug 30 to properly position itself within the neck 14 of fitting 10. A pressure balancing port 80 with pressure equalization valve 84 is provided to help overcome the differential pressure created as the elastomeric seal 42 engages the internal cylindrical surface 16 of neck 14 and plug 30 starts to seal. Adapter 36 provides means for the operator to activate valve 84 and relieve differential pressure across plug body 32.

Once completion plug 30 is in its proper and temporarily sealed position within neck 14, the leaves 38 are expanded to engage the groove 18 and hold plug 30 in place. The completion machine/adapter 36 and sandwich valve 20, as well as other equipment, may be safely removed. Fusible element 46 may then be fused. Fusible element 46 provides a permanent seal or circumferential fusion zone 54 formed between the fused external cylindrical surface 48 of fusible element 46 and the opposing fused internal cylindrical surface 16 of neck 14. (See FIG. 8.)

Plug body 32 also includes a fusible element 88 for use in fusing pressure equalization valve 84 to pressure relief balancing port 80. Fusible element 88 is embedded with an electric resistive element such as a fusion wire and provides a permanent seal or fusion zone 90 between a fused circumferential portion of the internal port surface 82 of pressure relief balancing port 80 and an opposing fused portion of the external surface 86 of pressure equalization valve 84, thereby preventing a leak path through port 80. Fusible elements 46 and 88 are preferably fused at the same time.

Figure 6:
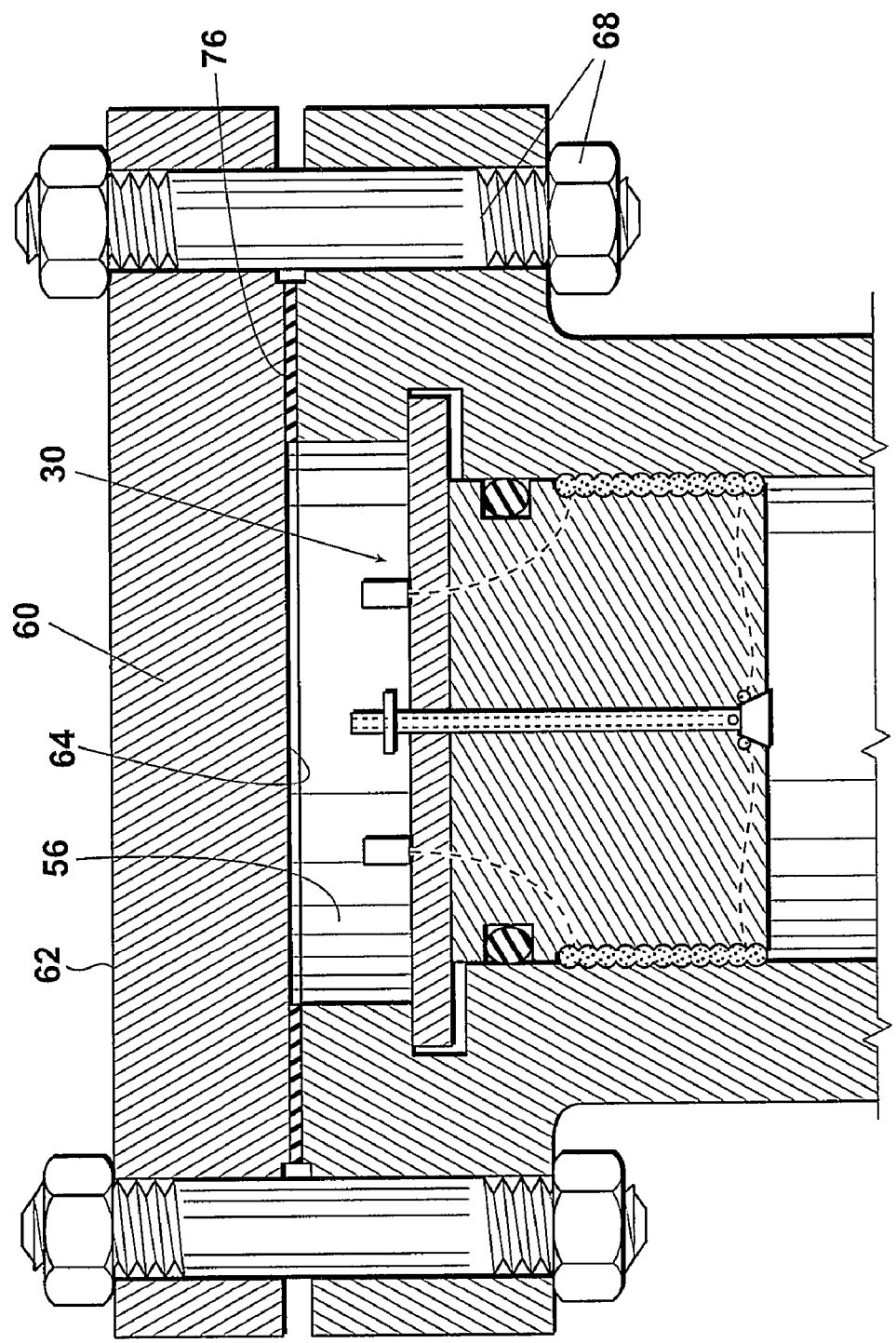
FIG. 6 is a view of a blind flange that has been installed above the completion plug in case the completion plug fusion fails. The completion plug does not interfere with the installation of the blind flange.
Figure 7:
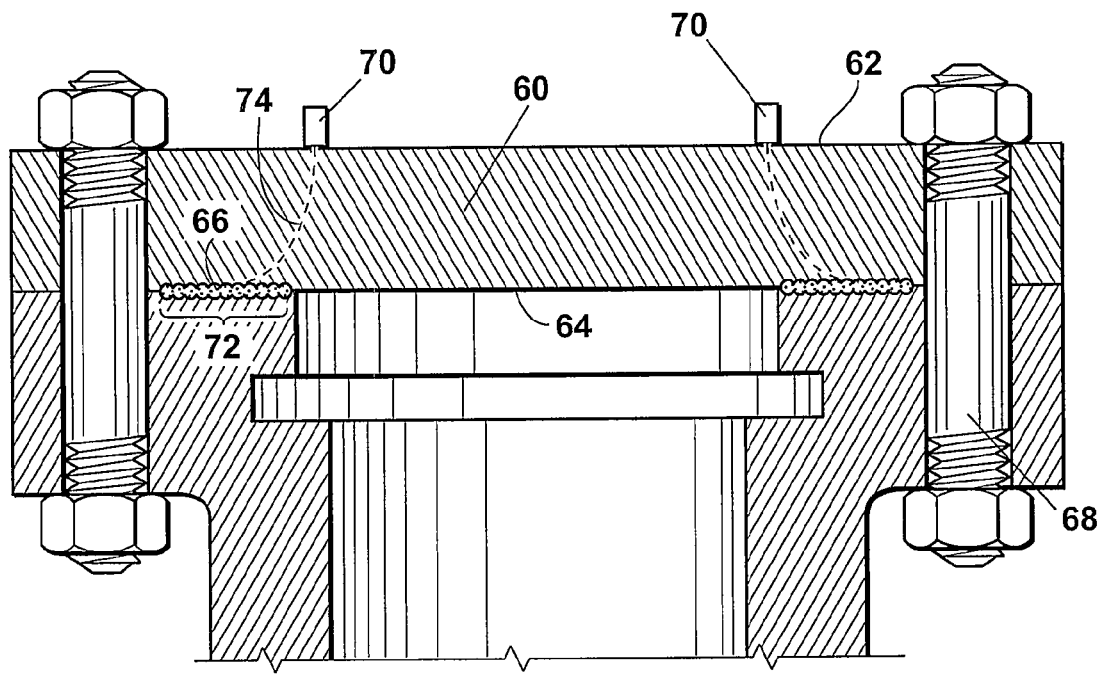
FIG. 7 is a view of a blind flange that includes a polyethylene blind flange and flange fusion sealing wires.

Referring now to FIGS. 6 and 7, because of the configuration and location of completion plug 30 within neck 14, a blind flange 60 having an upper surface 62 and a lower surface 64 may be installed above completion plug 30, leaving an interspace 56 in between. In one preferred embodiment, blind flange 60 is a standard blind flange and is fastened to flange 12 using standard fasteners 68. A gasket 76 provides a seal between the lower surface 64 and the flange 12. In another preferred embodiment, blind flange 60 is a polyethylene blind flange having a fusible element 66 located on lower surface 64. Fusible element 66 is embedded with an electric resistive element such as a fusion wire. Fusion terminals 70 are in communication with a power supply (not shown) that supplies an electric current via fusion wires 74 to fusible element 66. The electric current is effective for creating a permanent seal or fusion zone 72 between the fused lower surface 64 of blind flange 60 and fused flange surface 12 of fitting 10.

While a fusible completion plug and method for its use has been described with a certain degree of particularity, many changes may be made in the details of construction and the arrangement of components and steps without departing from the spirit and scope of this disclosure. A fusible completion plug made and used according to this disclosure, therefore, is not limited to the embodiments set forth herein for purposes of exemplification, but is to be limited only by the scope of the attached claims, including the full range of equivalency to which each element thereof is entitled.

What is claimed is:

1. A method for permanently closing an opening in a tubular member or vessel comprising the steps of:
    lowering a completion plug into an interior portion of a fitting connected to the tubular member or vessel and having a longitudinal cylindrical passageway therethrough;
    positioning the completion plug to a sealing position within the fitting;
    relieving differential pressure across the completion plug during the positioning step;
    creating by way of electrofusion a permanent seal between an external cylindrical surface portion of the completion plug and an opposing internal cylindrical surface of the fitting and (ii) between an external surface of a pressure equalization valve and an interior surface of a pressure balancing port located within the completion plug.

2. A method according to claim 1 further comprising the step of installing a blind flange above the completion plug.

3. A method according to claim 2 further comprising the step of creating by way of electrofusion a permanent seal between an external surface portion of the blind flange and an external surface portion of the fitting.

4. A method according to claim 1 further comprising the step of temporarily sealing the completion plug within the fitting.

* * * * *